Sept. 3, 1963　　　　J. R. ANDERSON　　　　3,102,518
SEAL CONSTRUCTION FOR ROTARY COMBUSTION ENGINE
Filed Dec. 7, 1961　　　　　　　　　　　　4 Sheets-Sheet 2

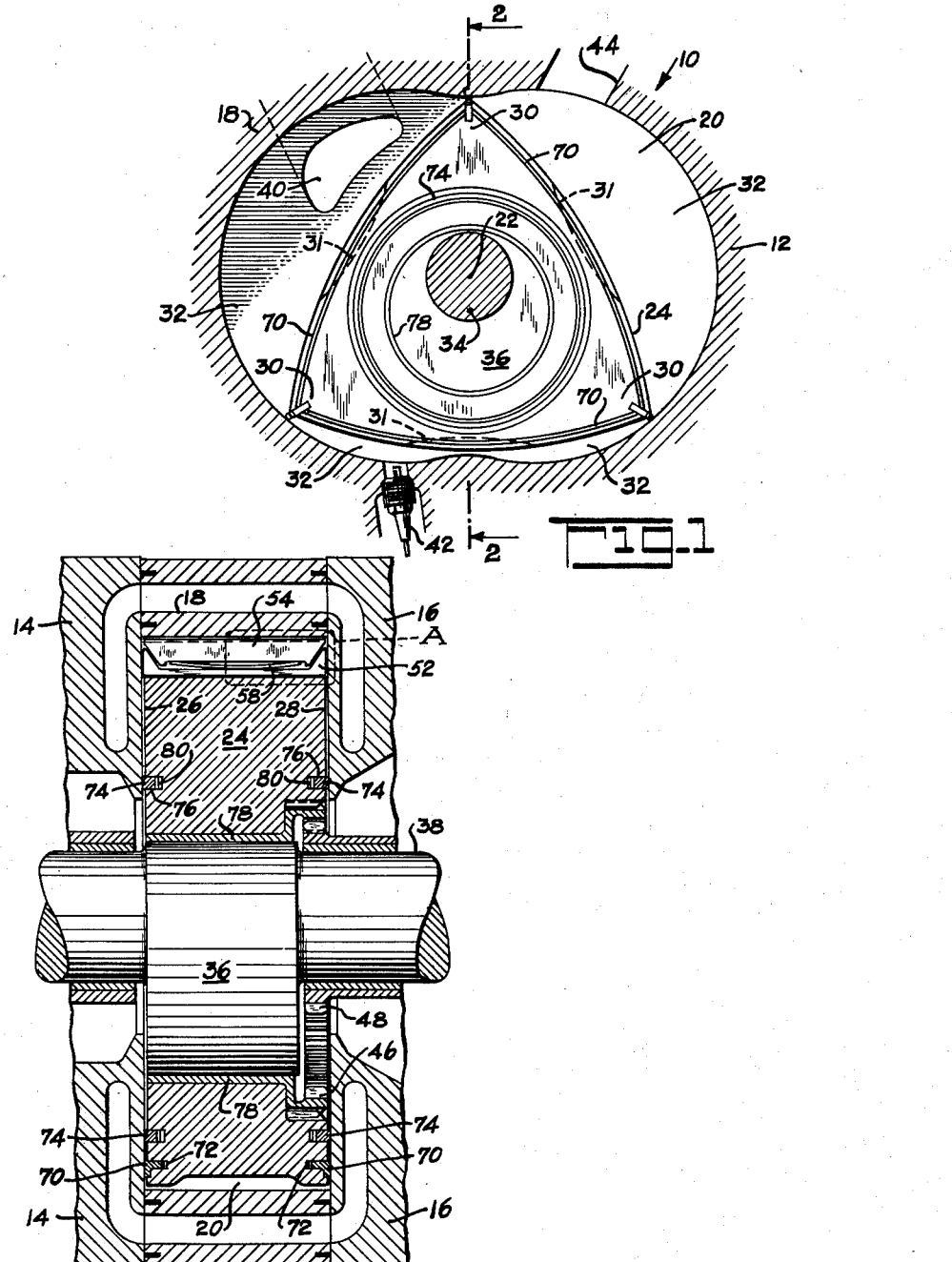

*INVENTOR.*
JOHN R. ANDERSON
BY
*William V. Ebs*
ATTORNEY

Sept. 3, 1963 J. R. ANDERSON 3,102,518
SEAL CONSTRUCTION FOR ROTARY COMBUSTION ENGINE
Filed Dec. 7, 1961 4 Sheets-Sheet 3

INVENTOR.
JOHN R. ANDERSON
BY
*William V. Ebs*
ATTORNEY

Sept. 3, 1963 J. R. ANDERSON 3,102,518
SEAL CONSTRUCTION FOR ROTARY COMBUSTION ENGINE
Filed Dec. 7, 1961 4 Sheets-Sheet 4

*INVENTOR.*
JOHN R. ANDERSON
BY
*William V. Ebs*
ATTORNEY

United States Patent Office 3,102,518
Patented Sept. 3, 1963

3,102,518
SEAL CONSTRUCTION FOR ROTARY
COMBUSTION ENGINE
John R. Anderson, Monsey, N.Y., assignor to Curtiss-
Wright Corporation, a corporation of Delaware
Filed Dec. 7, 1961, Ser. No. 157,752
15 Claims. (Cl. 123—8)

The invention relates to rotary combustion engines such as shown, for example, in copending application Serial No. 774,517 filed November 17, 1958, now U.S. Patent 2,988,065 granted June 13, 1961, and is particularly directed to a seal construction for such engines.

Such combustion engines comprise an outer body having axially-spaced end walls interconnected by a peripheral wall to form a cavity therebetween and an inner body or rotor received within said cavity between the cavity end walls. The inner surface of said peripheral wall preferably is parallel to the axis of said cavity and, as viewed in a plane transverse to said axis, said inner surface has a multi-lobed profile which preferably is an epitrochoid. The axis of said rotor is parallel to but spaced from the axis of the outer body cavity and said rotor has axially-spaced end faces disposed adjacent to said body end walls and also has a plurality of circumferentially-spaced apex portions. The rotor is rotatable relative to the outer body such that said apex portions continuously engage the inner surface of said peripheral wall to form a plurality of working chambers between said rotor peripheral wall which vary in volume, during engine operation, as a result of relative rotation of said rotor and outer body. Such engines also include an intake port for admitting the fuel-air mixture to said chambers, an exhaust port for said chambers and suitable ignition means such that during engine operation the working chambers of the engine have a cycle of operation which includes the four phases of intake, compression, expansion and exhaust. As described in said copending application this cycle of operation is achieved as a result of the relative rotation of said inner rotor and outer body and for this purpose both said inner rotor and outer body may rotate or one, preferably the inner rotor, may rotate while the outer body is stationary.

For efficient operation of the engine, its working chambers should be sealed and therefore an effective seal should be provided between each rotor apex portion and the inner surface of the peripheral wall of the outer body as well as between the end faces of the inner rotor and the end walls of the outer body.

A prime object of the invention is to provide an improved seal arrangement for the working chambers of the engine.

Another object of the invention is to provide an effective seal for the working chambers of the engine at each apex portion of the rotor comprising a simple two-piece construction for forming a seal with the inner surface of the peripheral wall of the outer body as well as with the end walls of the outer body and enabling the establishment and maintenance of a minimum clearance between one portion of the seal structure and said end walls.

Other objects and advantages of the invention will become apparent hereafter.

In accordance with the invention, the rotor carries at each apex portion an end wall sealing member and a peripheral wall sealing member. The end wall sealing member is of a length such that its ends are disposed in good sealing relation with the end walls of the outer body when the end wall sealing member and the end walls are at their respective normal operating temperatures. The peripheral wall sealing member is shorter in length than the end wall sealing member when the walls are at ambient temperature and can expand independently of the end wall sealing members in response to increasing temperatures. Preferably, the end wall sealing member is both thermally insulated, at least partially, from the peripheral wall sealing member, and has a thermal coefficient of expansion lower than that of the peripheral wall sealing member. With this construction, expansion of the end wall sealing member due to an increase in the temperature of the peripheral wall sealing member resulting from an increase in rotor r.p.m. is kept at a minimum. The construction permits the establishment and maintenance of a minimum clearance between the end wall sealing member and end walls of the outer body. The peripheral wall sealing member is urged into sealing engagement with the inner peripheral wall of the outer body as by a spring.

Referring to the drawings:

FIG. 1 is a diagrammatic transverse view of a rotary engine embodying a sealing arrangement according to the invention;

FIG. 2 is a sectional view taken along the line 2—2 of FIG. 1;

Figure 3:
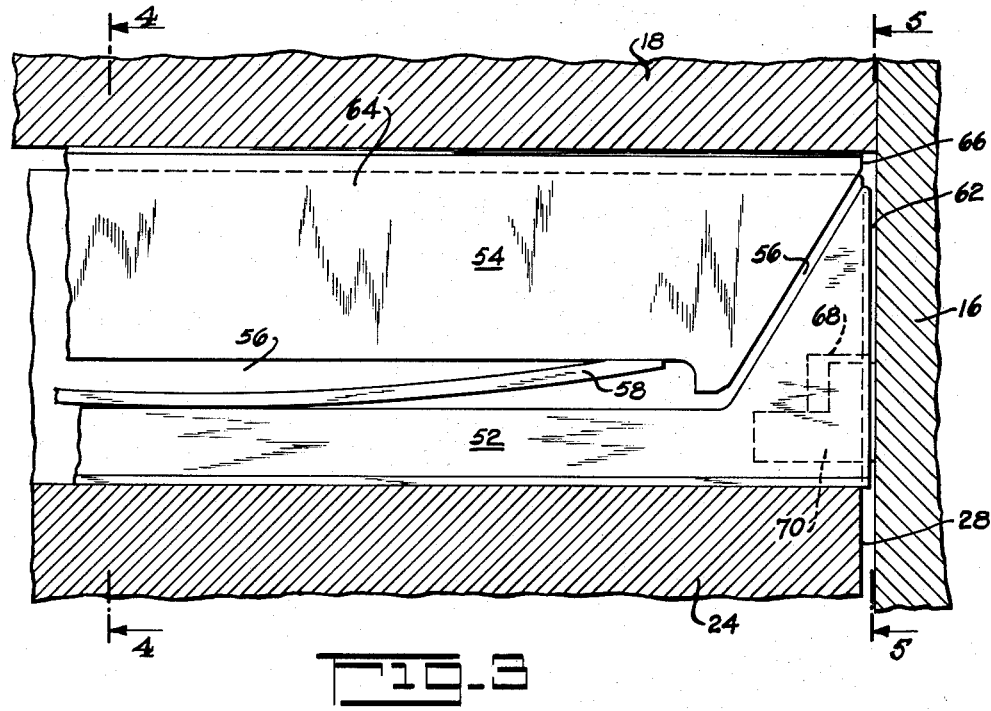
FIG. 3 is an enlarged view of portion A of FIG. 2.
Figures 4, 5:
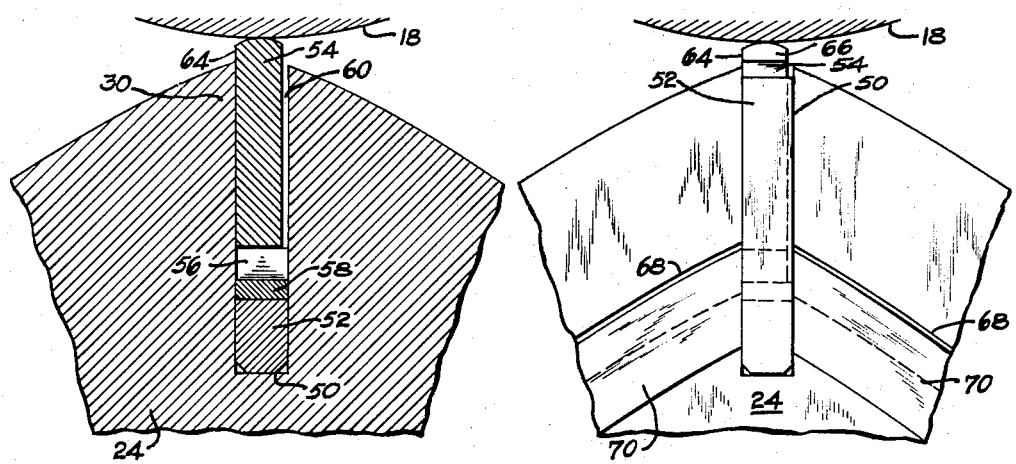
FIG. 4 is a sectional view taken along the line 4—4 of FIG. 3.
FIG. 5 is a view taken along the line 5—5 of FIG. 3.

Referring to FIGS. 1, and 2, reference character 10 designates a rotary internal combustion engine. Said engine 10 comprises an outer body 12 having axially-spaced end walls 14 and 16 with a peripheral wall 18 connected therebetween to form a cavity 20 which, as viewed in a plane (FIG. 1) transverse to the axis 22 of the cavity 20, has a multi-lobed profile. In the specific embodiment illustrated, said cavity profile has two lobes although the engine is not limited to this specific number of lobes.

An inner rotor 24 is disposed within the cavity 20 of the outer body 12. The inner rotor has axially-spaced end faces 26 and 28 disposed adjacent to the outer body end walls 14 and 16. In addition, the inner rotor has a plurality of circumferentially-spaced apex portions 30 which, as explained in said aforementioned application, preferably are one more in number than the number of lobes of the cavity 20. As illustrated, the rotor 24 has three apex portions 30 and the periphery of the rotor has a generally triangular profile. As hereinafter more fully explained, said apex portions 30 are in sealing engagement with the inner surface of the peripheral wall 18 to form a plurality (three as illustrated) of working chambers 32 between the inner rotor 24 and outer body 12. Each working chamber 32 includes a trough 31 formed in the adjacent peripheral face of the rotor 24, each said trough forming a substantial part of the combustion space during combustion in said chamber. The geometrical axis 34 of the rotor 24 is offset from and is disposed parallel to the axis 22 of the outer body.

In the engine 10 illustrated, the outer body 12 is stationary while the inner rotor 24 is journaled on an eccentric portion 36 of a shaft 38, the axis of said shaft being co-axial with that of the cavity 20 of said outer body. Upon rotation of the inner rotor 24 relative to the outer body 12 the working chambers 32 vary in volume. An intake port 40 is provided in one or both end walls 14 and 16 for admitting air and fuel into the working chambers, a spark plug 42 is provided for igniting the combustion mixture and an exhaust port 44 is provided in the peripheral wall for discharge of the exhaust gases from the working chambers 32. As more fully explained in the aforementioned copending application, during engine operation the working chambers 32 have a cycle of operation including the four phases of intake, compression, expansion and exhaust, said phases being similar to the strokes in a reciprocating-type internal combustion engine having a four-stroke cycle. In order to maintain the relative motion of the inner rotor 24 relative to the stationary outer body an internal gear 46 is, as illustrated, coaxially secured to the inner rotor and is disposed in mesh with a fixed gear 48 secured to the outer body by means not shown, said fixed gear being co-axial with the shaft 38. As also explained in said copending application, the outer body 12, as well as the inner body 24, may rotate instead of, as in the embodiment illustrated, only one of said bodies rotating.

For efficient operation, the working chambers 32 should be sealed. FIGS. 1–5 show one form of seal according to the invention, for accomplishing this purpose. Referring to these views it will be seen that each rotor apex portion 30 has a groove 50 extending inwardly, preferably radially, from the apex and running from one end face 26 to the other end face 28 in a direction parallel to the rotor axis. Each of these rotor grooves carries identical structure for forming a seal with the inner surface of the peripheral wall 18 of the outer body 12 and with the inside surfaces of the end walls 14 and 16 of the outer body. Such structure includes an inner U-shaped end wall sealing member 52 and an outer peripheral wall sealing member 54 having a generally trapezoidal shape. Member 54 nests in the member 52, but is separated therefrom by a gap 56, created by a spring 58 which is disposed between and bears against the members.

The end wall sealing member 52 fits tightly in the apex groove 50. A good seal is thereby established between contacting surfaces of the member and groove. The end wall sealing member 52 extends axially in the groove into close proximity with the end walls of the outer body to form a seal with the end walls. Member 54 has a looser fit in the groove 50 than member 52. The looser fit is provided for member 54 so that the member can move freely, radially, to maintain sealing engagement with the inner surface of peripheral wall 18 of the outer body, such sealing engagement being enforced by spring 58. Member 54 is urged laterally, when the engine is in operation, by differential pressure into sealing engagement with one side face or the other of groove 50, a slight clearance 60 being left at the other side face of the groove. Gas pressure from the adjacent working chamber is transmitted into the gap 56 between members 52 and 54 where it adds to the force of spring 56 urging peripheral sealing member 54 radially outwardly. The gap 56 should be either almost wholly below the outer edge of the groove 50 as shown or entirely so, such that substantially no pressure is transmited between adjacent chambers through the gap.

The copending patent application of Max Bentele, for Rotating Combustion Engine Seal Construction, Serial No. 5497, filed January 9, 1960, now U.S. Patent 3,033,180 granted May 8, 1962, and assigned to the same assignee as the present invention, discloses an engine of the type described herein, such engine including an outer body and sealing structure at each apex portion of the rotor. A one-piece sealing structure is, however, used in the engine of said application in place of the peripheral wall sealing member 54 and end wall sealing member 52 referred to herein. The patent application specifies requirements for and gives examples of materials from which an outer body and contacting one-piece seal structure may be formed. Materials suitable for such outer body and one-piece seal structure of the said copending application may also be used for the outer body 12 and peripheral wall sealing member 54 respectively. The end wall sealing member 52 however, should be constructed of a material having a thermal coefficient of expansion, the value of which is less than that for the co-operating peripheral wall sealing member 54. Preferably the end wall sealing member is constructed from a material having the lowest thermal coefficient of expansion among materials exhibiting wear characteristics, strength characteristics, etc. which indicate suitability for the purpose. Such member is considered suitable when capable of performing satisfactorily in the engine for as long a time as the peripheral wall sealing member. Conditions to which the end wall sealing member 52 is exposed are less severe than those to which the peripheral wall sealing member 54 is subjected. There are, therefore, many more materials which can be used for the end wall sealing member than for the peripheral wall sealing member.

Considerable heat is generated in peripheral wall sealing member 54 due to its rubbing contact with the peripheral wall of the outer body. The end wall sealing member 52 is, however, partially insulated from this heat by the gap 56. As rotor speed increases, the temperature of the peripheral wall sealing member increases and the member expands accordingly. Member 52 expands to a lesser extent due to the insulating gap 56 between the members 52 and 54, and the lower thermal coefficient of expansion of member 52. The length of member 52 is determined to provide for the existence of only small running clearances 62 (shown greatly exaggerated in FIG. 3) between end surfaces of member 52 and the end walls 14 and 16 of the outer body when normal operating temperatures prevail in the engine such that a good seal is established between member 52 and said end walls. Because of the limited expansion (and contraction) of the end wall sealing member 52, a good seal is maintained over the operating range of the engine, and the possibility of the end wall sealing member binding against the end walls 12 and 14 is avoided. Obviously, a better seal at the end walls can be provided for, with the apex seal structure of the invention than with a one-piece sealing structure which must maintain contact with the peripheral wall of the outer body and also form a seal with the end walls of such outer body.

Preferably, only a small portion 64 of the peripheral wall sealing member 54 projects radially beyond the ends of member 52. Such projecting portion includes sealing faces at the ends as at 66. The overall length of the projecting portion 64 is less than that of the end wall sealing member 52. Preferably, the length of projection portion 64 is such that end faces 66 form a good seal with the end walls of the outer body when normal operating temperatures prevail in the engine.

Each end face 26 and 28 of the inner rotor 24 includes grooves 68 which run between the grooves 50 in the apex portions of the rotor. A one-piece seal strip 70 is received within each groove 68. For ease of fabrication each groove 68 for a seal strip 70 preferably has the shape of a circular arc in the plane of its rotor end face. Also, each strip 70 is disposed adjacent to, but inwardly of the rotor periphery, said periphery being generally triangular in shape with outwardly arched sides. A spring 72 behind each end face seal strip 70 urges it axially outwardly so that said strip 70 projects axially beyond the adjacent rotor end face into sealing engagement with the adjacent housing end wall.

The seal strips 70 sealingly engage the end wall sealing members 52 to provide a continuous contact area in sealing engagement with the adjacent end wall 14 or 16 of the outer body 12, said seal contact area encircling the rotor axis and being disposed adjacent to the rotor periphery, whereby a seal is provided adjacent to the rotor periphery against inward flow of combustion gases between the rotor end faces 26 and 28 and the end walls 14 and 16. In addition a seal ring 74 is disposed in a circular groove 76 in each end face of the rotor radially outwardly of the journal bearing 78 for said rotor on the shaft eccentric 36 and radially inwardly of the end face seal strips 70. The seal strips 74 function as oil seals to prevent leakage of lubricating oil radially outwardly beyond said seal rings 74 between their associated rotor end faces and outer body end walls. Suitable spring means 80 may be provided behind each oil seal 74.

Figure 6:
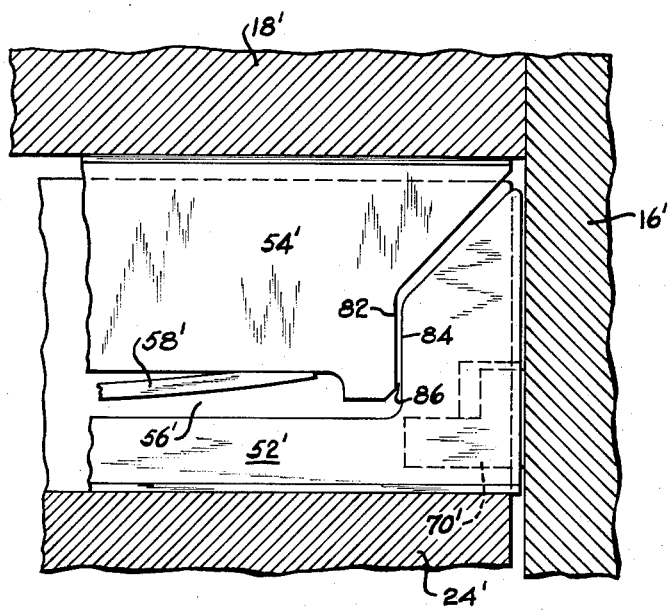
FIG. 6 is a view similar to FIG. 3 showing a modified sealing structure.

FIG. 6 illustrates a modification of the apex sealing structure shown in FIGS. 1–5. Such modification consists in adapting the apex seal structure to limit movement of the peripheral wall sealing member in an axial direction. The seal structure of FIG. 6 is otherwise the same as the seal structure of FIG 5. Parts in FIG. 6 corresponding to parts in FIGS. 1–5 are designated by the same reference character, but with a prime mark (′) added thereto. For the purpose of preventing undue axial movement of the peripheral wall sealing member, denoted by reference character 54′, opposite end portions are provided with radially extending surfaces, one of which is shown at 82. Opposing radial extending surfaces as shown at 84 are provided on the end wall sealing member 52′, the adjacent opposing surfaces being separated by a gap 86 which limits movement of peripheral wall sealing member 54′ in an axial direction relative to the end wall sealing member 52′. The gap 86 should be such as to prevent the peripheral wall sealing member from sliding in groove 50′ of the rotor 24′ into contact with one or the other of the end walls as, for example, 16′ of the outer body.

Figure 7:
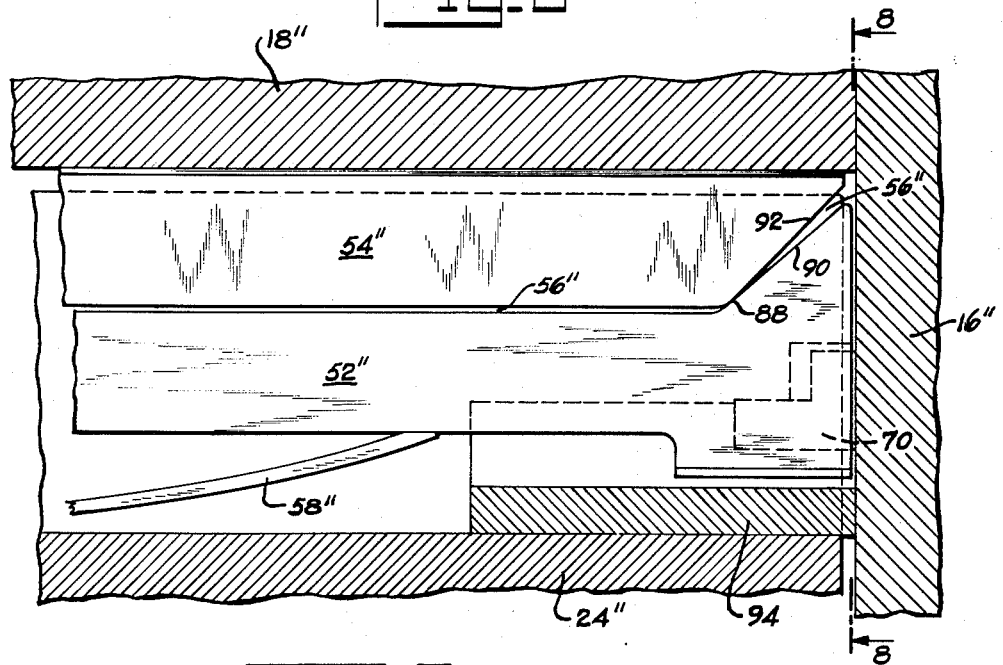
FIG. 7 is a view similar to FIG. 3 showing still another modified seal structure.
Figure 8:
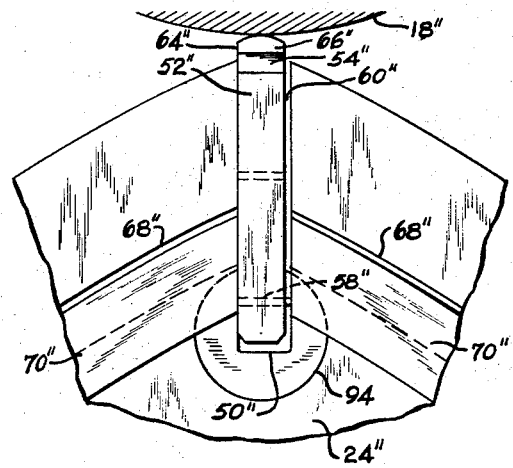
FIG. 8 is a view taken along the line 8—8 of FIG. 7.
Figure 9:
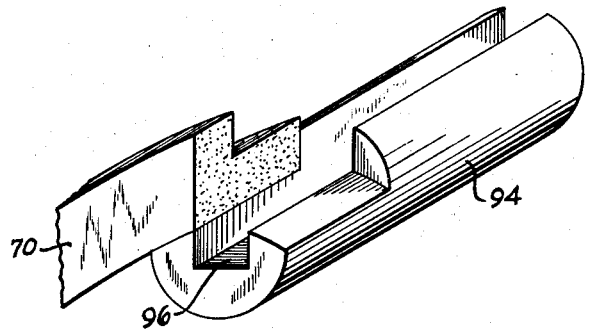
FIG. 9 is a perspective view showing portions of the sealing arrangement of FIG. 7.

Another modification of the apex seal structure of the invention is shown in FIGS. 7–9, wherein parts corresponding to the parts of FIGS. 1–5 are designated with the same reference characters, but with a double prime mark (″) added thereto. In this form of the invention the peripheral wall sealing member and end wall sealing member which bear reference characters 54″ and 52″ are maintained in contact. Such parts contact at inner ends of the peripheral wall sealing member 54″ at 88 on inclined surfaces 90 and 92 which extend at an acute angle relative to each other. The members 52″ and 54″ are otherwise separated by insulating gap 56″. In the sealing structure of FIGS. 7–9 peripheral wall sealing member 54″ is urged radially outward into sealing engagement with the peripheral wall 18″ by a spring 58″ which is located under the end wall sealing member 52″ and bears against member 52″ and the bottom of the groove.

Both members 52″ and 54″ must move radially to maintain peripheral wall sealing member 54″ in sealing engagement with the inner surface of peripheral wall 18″, and the fit of both members is sufficiently loose to permit such radial movement. Members 52″ and 54″ are both urged toward one side or the other of groove 50″ for sealing engagement therewith by the pressure differential between adjacent working chambers, thereby leaving a slight clearance 60″ at the other side face of the groove (FIG. 8). Gas pressure from the adjacent working chamber is transmitted through clearance 60″ into the bottom of groove 50″ where said pressure adds to the force of spring 58″, urging the seal structure in the groove radially outward. In order to prevent leakage of gas pressure at the ends of rotor 24″, intermediate seal members 94 of the kind disclosed in the aforesaid patent application of Max Bentele, for Rotating Combustion Engine Seal Construction, Serial No. 5,497, filed January 29, 1960, are provided at both ends of the rotor. The intermediate seal members 94 (only one of which is illustrated), are slidably received in a cylindrical enlarged portion at each end of groove 50″. Each seal member 94 has a slot 96 for receiving the radial inner edge of the end wall sealing member 52″ for sealing co-operation therewith. Gas pressure, which is transmitted through the clearances 60″ into the bottom of the groove, urges the intermediate seal members 94 at the ends of said groove axially into sealing engagement with end walls of the outer body 12″.

Sealing engagement of one intermediate seal member 94 with end wall 16″ is shown in FIG. 7. As shown in FIG. 8, end face seal strips 70″ extend to the groove 50″ for sealing engagement with one side face or the other of the end wall sealing member 52″.

While several modifications of the invention have been shown, it will be apparent that still other changes may be made within the spirit and scope of the invention by one skilled in the art. Having described the invention, what I claim is:

1. A sealing arrangement for the working chambers of a rotary combustion engine comprising an outer body having axially-spaced end walls and a peripheral wall interconnecting said end walls to form a cavity therebetween; an inner rotor received within said cavity and having axially-spaced end faces adjacent to said end walls and also having a plurality of circumferentially-spaced apex portions for engagement with the inner surface of said peripheral wall to form a plurality of working chambers between said rotor and peripheral wall which vary in volume upon relative rotation of said rotor and outer body; said sealing arrangement comprising at each apex portion, an end wall sealing member carried by the apex portion and of a length such that each of its ends is disposed in good sealing relation with the adjacent end wall of the outer body when said end wall sealing member and end walls are at their respective normal engine operating temperatures; a peripheral wall sealing member also carried by the apex portion shorter in length than the end wall sealing member when the members are at ambient temperature, and free to expand relative to the end wall sealing member toward the end walls of the outer body as the temperature of the peripheral wall sealing member is increased, the material of the peripheral wall sealing member having a lower thermal coefficient of expansion than the material of the end wall sealing member; and means for urging the peripheral wall sealing member into sealing engagement with the peripheral wall inner surface.

2. A sealing arrangement as defined in claim 1 wherein the peripheral wall sealing member is thermally insulated, at least partially, from the end wall sealing member.

3. The sealing arrangement of claim 2 wherein the means for urging the peripheral wall sealing member into sealing engagement with the peripheral wall inner surface is a spring located between the end wall sealing member and peripheral wall sealing member.

4. The sealing arrangement of claim 2 where the means for urging the peripheral wall sealing member into sealing engagement with the peripheral wall inner surface is a spring located between the end wall sealing member and peripheral wall sealing member, and said sealing members are held out of contact by the spring.

5. The sealing arrangement of claim 2 wherein the means for urging the peripheral wall sealing member into sealing engagement with the peripheral wall inner surface is a spring located under said end wall sealing member.

6. The sealing arrangement of claim 2 wherein the peripheral wall sealing member is supported on the end wall sealing member and the means for urging the peripheral wall sealing member into engagement with the peripheral wall inner surface is a spring located under said end wall sealing member.

7. The sealing arrangement of claim 2 wherein the sealing members have opposing surfaces which limit axial movement of the peripheral wall sealing member.

8. The sealing arrangement of claim 2 wherein the means for urging the peripheral wall sealing member into sealing engagement with the peripheral wall inner surface is a spring located under said end wall sealing member and the sealing members have opposing surface which limit axial movement of the peripheral wall sealing member.

9. The sealing arrangement of claim 2 wherein the sealing members are received in a groove in the apex portion and the end wall sealing member rests on the bottom of the rotor groove.

10. The sealing arrangement of claim 2 wherein the sealing members are received in a groove in the rotor apex portion and the means for urging the peripheral wall sealing member into sealing engagement with the peripheral wall inner surface is a spring which bears against the inner wall sealing member and the bottom of the rotor groove.

11. The sealing arrangement of claim 2 wherein the sealing members are received in a groove in the apex portion and are separated by a gap, the greater portion of which lies wholly within the groove.

12. The sealing arrangement of claim 2 wherein the sealing members are received in a groove in the rotor apex portion and the means for urging the peripheral wall sealing member into sealing engagement with the peripheral wall inner surface is a spring located between the members, said peripheral wall sealing member having a sliding fit in the groove and the end wall sealing member having a tight fit in the groove such as to prevent the flow of combustion gases between adjacent surfaces thereof.

13. The sealing arrangement of claim 12 including a plurality of one-piece seal strips received in grooves in a rotor end face for sealing engagement with the adjacent end wall of the outer body, there being one such end face seal strip for and extending between each pair of adjacent rotor apex portions, the end wall sealing member at each apex portion being in sealing engagement with adjacent ends of one pair of the one-piece end face seal strips.

14. A sealing arrangement for the working chambers of a rotary combustion engine comprising an outer body having axially-spaced end walls and a peripheral wall interconnecting said end walls to form a cavity therebetween; an inner rotor received within said cavity and having axially-spaced end faces adjacent to said end walls and also having a plurality of circumferentially-spaced apex portions for engagement with the inner surface of said peripheral wall to form a plurality of working chambers between said rotor and peripheral wall which vary in volume upon relative rotation of said rotor and outer body; said sealing arrangement comprising at each apex portion, a first sealing member disposed in a groove and having opposite end portions for sealing against the end walls of the engine; and a peripheral wall sealing member shorter in length than said first sealing member disposed in the groove between said end portions, and movable radially for maintaining sealing engagement with the inner surface of the peripheral wall, the first sealing member and the peripheral wall sealing member being so constructed that movement of the peripheral wall sealing member longitudinally in the groove is limited by said first sealing member.

15. The sealing arrangement of claim 14 including a spring in said groove between the first sealing member and the peripheral wall sealing member for urging said peripheral wall sealing member radially outwardly.

No references cited.